Dec. 22, 1942.    P. L. PENDLETON    2,306,110
APPARATUS FOR TESTING SPECIMENS
Filed Feb. 3, 1940
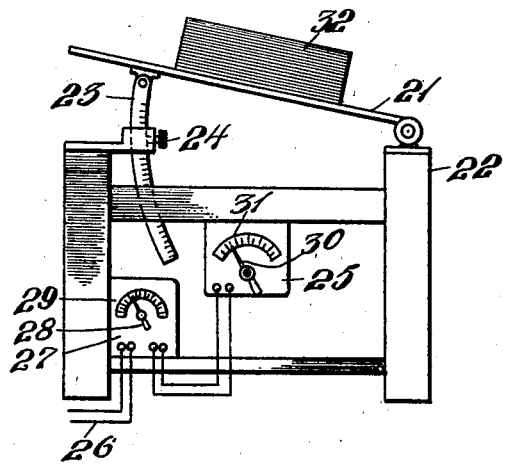
INVENTOR.
Pyam L. Pendleton
BY Barlow & Barlow
ATTORNEYS.

Patented Dec. 22, 1942

2,306,110

UNITED STATES PATENT OFFICE 2,306,110

APPARATUS FOR TESTING SPECIMENS

Pyam L. Pendleton, Cranston, R. I., assignor to Henry L. Scott Company, a corporation of Rhode Island Application February 3, 1940, Serial No. 317,143

3 Claims. (Cl. 73—51)

This invention relates to the testing of specimens of various materials and has for one of its objects to provide a test which may be used as a routine production test to indicate by summation the resultant of various qualities possessed by the specimen as a whole.

Another object of the invention is the testing of the natural vibration periods of a specimen, that is, the period or rate of vibration which is associated with the greatest amount of internal molecular displacement for the smallest amount of external applied motion.

Another object of the invention is to provide a test for a specimen which will be indicated by the motion of the specimen.

Another object of the invention is to provide a test for the specimen which will not destroy the specimen, but will permit it to be used for its desired functions.

With these and other objects in view, the invention consists of certain novel features of construction as will be more fully described and particularly pointed out in the appended claims.

In the accompanying drawing, the figure is a diagrammatic elevation of a general arrangement of an apparatus for performing the required tests.

In the testing of specimens there is usually associated in one's mind the destruction of the specimen in order that the characteristics of the specimen may be examined. Many times specimens may be tested from the standpoint of each of several materials which go into the finished product each having its own test performed upon it rather than upon the product as a whole which is to be sold. I have found that many specimens when completed and their desired characteristics are present will be resonant to certain frequency of vibrations with a very small amount of externally applied motion. That is, each product has a natural vibration period, and if a specimen of the product does not respond to a certain range which may be an index for each specimen of material examined, the specimen will not be acceptable and should be withdrawn and placed with seconds. Accordingly, I have arranged a test which may be used as a routine production test for all material finished that it may be acceptable or rejected from an inspection standpoint, thereby not requiring particular skill of an inspector; and the following is a more detailed description of the present embodiment of this invention, illustrating the preferred means by which these advantageous results may be accomplished:

With reference to the drawing, I have illustrated one form of applying my vibration test to specimens.

In the testing of a specimen device such as illustrated in the drawing, I have provided an inclined support plate 21 mounted upon a frame 22 with a quadrant 23 adjustable as at 24 to position the support 21 at the desired incline. I provide a vibrator 25 mounted upon the frame which will receive power from an external source 26 through an amplitude control 27 adjusted by arm 28 over the calibrated arc 29. The rate of vibrations may be adjusted by the control 30 adjustable over the calibrated arc 31.

In the testing of the specimen, support 21 is inclined at an angle to the horizontal such that the friction of the specimen 32 placed on the support will remain at rest or in balanced condition through its friction with the support 21 with the amplitude constant. Vibrations will be set up by means of vibrator 25 and the frequency of vibrations will be changed by the control 30 until that frequency is arrived at when a specimen through the natural resonance of its natural vibration period will commence to move because of the friction between the specimen and the inclined support being reduced to such a point that gravity will act to move the specimen. The power applied or amplitude of the vibrations will be such that the specimen will not move except when the natural vibration period is arrived at.

In some cases, instead of varying the frequency of vibrations, this frequency may remain constant, but because of the increase in mass the amplitude through the control 28 may be varied until vibration will cause movement of the specimen 32.

In each case the frequency will be noted as well as the amplitude, and a satisfactory routine test may be worked out for all productive work based upon a known range of vibration which has been found to produce satisfactory results.

The foregoing description is directed towards the construction illustrated, but I desire it to be understood that I reserve the privilege of resorting to all the equivalent changes to which the construction is susceptible, the invention being defined and limited only by the terms of the appended claims.

I claim:

1. The method of determining the resonant frequency of apparently duplicate unit specimens, which consists in positioning the specimen on an inclinable support sufficient to maintain the specimen by friction, applying controlled external vibrations at a constant amplitude to the specimen in a calibrated range of frequency in order to produce an index motion of the specimen, and then noting from the calibrated range the frequency at which the specimen begins to move along the inclined plane due to its natural resonance.

2. The method of determining the resonance of apparently duplicate unit specimens which consists in positioning the specimen on an inclinable support sufficient to maintain the specimen by friction, applying controlled external vibrations at a constant frequency to the specimen in a calibrated range of amplitude in order to produce an index motion of the specimen, and then noting from the calibrated range the amplitude at which the specimen begins to move along the inclined plane.

3. In a testing apparatus a supporting frame, a supporting plate pivoted at one end to the frame, an arcuate link adjacent the other end of the plate adjustably connecting the plate to the frame for fixing the degree of inclination thereof, a vibrator fixed to the frame for inducing vibrations into the frame and plate mounted thereon, and means to control the frequency and amplitude of vibrations over a calibrated range.

PYAM L. PENDLETON.